United States Patent
Noirot

(10) Patent No.: US 7,225,611 B2
(45) Date of Patent: Jun. 5, 2007

(54) PROCESS AND DEVICE FOR THE DECONTAMINATION OF THE EXHAUST GASES FROM AN INTERNAL COMBUSTION ENGINE

(75) Inventor: Rémi Noirot, Puteaux (FR)

(73) Assignee: Peugeot Citroen Automobiles SA, Velizy-Villacoublay (FR)

( * ) Notice: Subject to any disclaimer, the term of this patent is extended or adjusted under 35 U.S.C. 154(b) by 130 days.

(21) Appl. No.: 10/895,109

(22) Filed: Jul. 21, 2004

(65) Prior Publication Data

US 2005/0022518 A1 Feb. 3, 2005

(30) Foreign Application Priority Data

Jul. 31, 2003 (FR) .................................... 03 09469

(51) Int. Cl.
*F01N 3/00* (2006.01)
*F01N 3/02* (2006.01)

(52) U.S. Cl. ............................. 60/295; 60/285; 60/287; 60/297; 60/311

(58) Field of Classification Search ................ 60/286, 60/287, 295, 297; 123/1 A
See application file for complete search history.

(56) References Cited

U.S. PATENT DOCUMENTS

| | | | |
|---|---|---|---|
| 3,501,279 A * | 3/1970 | Allen et al. ................. | 44/385 |
| 5,722,236 A * | 3/1998 | Cullen et al. ................ | 60/274 |
| 6,023,928 A * | 2/2000 | Peter-Hoblyn et al. ....... | 60/274 |
| 6,200,358 B1 * | 3/2001 | Fleischer et al. ............. | 44/300 |
| 6,276,310 B1 * | 8/2001 | Backes et al. ............... | 123/1 A |
| 6,588,203 B2 * | 7/2003 | Hirota et al. ................ | 60/297 |
| 6,622,480 B2 * | 9/2003 | Tashiro et al. .............. | 60/295 |
| 6,631,612 B1 * | 10/2003 | Setoguchi et al. ............ | 60/295 |
| 2003/0084858 A1 * | 5/2003 | Kracklauer ................ | 123/1 A |

FOREIGN PATENT DOCUMENTS

| | | |
|---|---|---|
| FR | 0 341 832 | 11/1989 |
| FR | 0 590 814 | 4/1994 |
| FR | 2 771 449 | 5/1999 |
| FR | 1 148 227 | 10/2001 |

\* cited by examiner

*Primary Examiner*—Thomas Denion
*Assistant Examiner*—Loren Edwards
(74) *Attorney, Agent, or Firm*—Nicolas E. Seckel

(57) ABSTRACT

Process for the decontamination of the emissions from an internal combustion engine (1), the exhaust line (5) of which is equipped with a particle filter (7), characterized in that an $NO_x$ trap additive is added to the fuel, so that the said additive is found trapped within the soot, and in that, at the time of the regenerations of the particle filter (7), the engine (1) is controlled with a richness balance according to at least one alternation of a lean-mixture phase and of a rich-mixture phase, in order to bring about the adsorption of the $NO_2$ from the exhaust gases by the said additive during the lean-mixture phase or phases and to bring about the oxidation of the soot particles by the adsorbed $NO_2$ during the rich-mixture phase or phases.

Device for the implementation of this process.

15 Claims, 1 Drawing Sheet

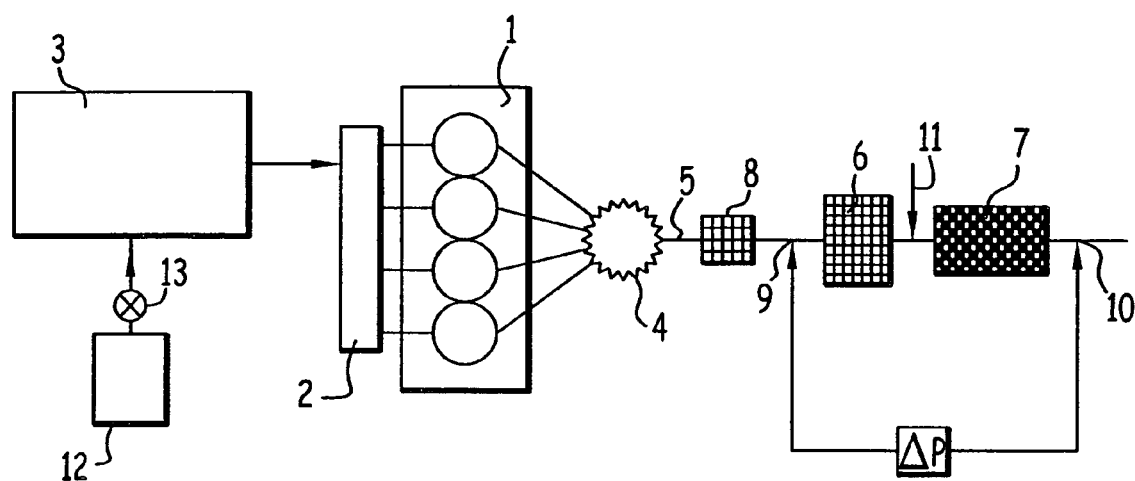

PROCESS AND DEVICE FOR THE DECONTAMINATION OF THE EXHAUST GASES FROM AN INTERNAL COMBUSTION ENGINE

The invention relates to internal combustion engines and more specifically to processes and devices targeted at reducing the polluting emissions from these engines, in particular diesel engines.

The polluting emissions from internal combustion engines, in particular diesel engines, are mainly divided into four categories, the amounts of which discharged to the atmosphere have to be confined within limits set by legislation:

CO;
hydrocarbons;
nitrogen oxides $NO_x$;
solid particles.

The equipping of vehicle exhaust lines with particle filters is known for this purpose. Their first role is to trap solid particles. Periodically, it is necessary to combust the particles, so as to regenerate the filter in order to restore thereto its nominal filtration capacity.

It should be remembered that the particles (soot) are composed, when they are deposited on the filter, of:

an aggregate of carbon particles representing 50 to 95% by weight of the soot;

metallic or inorganic elements, or metal oxides, resulting from the combustion of diesel oil and its possible additives, the lubricating oil or the wear of the internal metal parts of the engine, which represent a few % by weight of the soot;

sulphates or nitrates, generally present in the ionic state, resulting from the combustion of sulphur-comprising hydrocarbons present in the fuel and from the oxidation of NO to $NO_2$ and then from the combination of $NO_2$ with the oxides present in the soot, for example: $NO_2$+ BaO→$BaNO_3$ or $K_2O+2NO_2$→$2KNO_3$;

liquids (hydrocarbons, water, and the like) adsorbed in the internal structure of the carbon aggregates in a relatively large amount, representing up to approximately 50% by weight of the soot.

Several processes are known for removing this soot during operations for the regeneration of the filter by combustion.

A first solution consists in heating the filter to a sufficient temperature and for a sufficient period of time. Doing this, the adsorbed liquid phases are evaporated and the internal structure of the soot is dried out. A temperature greater than 500° C. is necessary to obtain evaporation of all the unburnt hydrocarbons. Furthermore, this rise in temperature makes it possible, at approximately 550° C. and above, to initiate the reaction of the carbon of the soot with the oxygen adsorbed at its surface. Additives added to diesel oil, such as cerium, make it possible to promote this combustion.

A second solution consists in burning the hydrocarbons adsorbed on the soot in order for the heat given off during this combustion to make possible the creation of conditions favourable for the combustion of the carbon just mentioned. To do this, a hot point can be created within the bed of soot, for example by means of a heater plug placed in a facing position in front of the filter, which complicates the design of the exhaust line. Another solution consists in catalyzing this combustion of the hydrocarbons at low temperature, generally by means of alkali metals or alkaline earth metals. These catalysts can be added to the fuel or can impregnate the particle filter. To be applicable, this principle requires, however, that the engine emit a relatively large amount of non-incinerated hydrocarbons. This is not the case with the most efficient diesel engines. Furthermore, the need to reduce CO emissions requires the use of very efficient oxidation catalysts upstream of the filter. The soot accumulated in the filter is therefore generally very dry and not very heavily laden with hydrocarbons.

A third solution consists in using the $NO_2$ present in the exhaust gases to promote the oxidation of the soot at low temperature, i.e. from 300° C. However, the kinetics of this reaction are slow. This is because the creation, by the $NO_2$, of oxygen adsorbed at the surface of the carbon, which constitutes the first stage of the reaction, is limited by the diffusion of the $NO_2$ towards the carbon. The presence of other entities adsorbed in the internal structure of the soot, such as water, hydrocarbons, sulphates, and the like, interferes with this diffusion. Furthermore, the reactivity of the soot in the presence of $NO_2$ is sensitive to the partial pressure of the $NO_2$. It would be necessary to have available 2% of $NO_2$ in the exhaust gases to burn the soot at 300° C. as rapidly as at 550° C. under 10% of oxygen. In point of fact, diesel engines emit little $NO_x$, in particular because of the installation of exhaust gas recirculation systems (EGR systems) which make it possible to reduce the amounts emitted as required by pollution-control standards. The $NO_x$ contents accessible in exhaust gases are generally between 0 and 1000 ppm.

The reactivity of soot with respect to $NO_2$ can be substantially improved when oxygen is preadsorbed on the carbon particles or if the soot comprises an oxide capable of providing oxygen in its internal structure, such as ceria $CeO_2$ or a ceria/zirconia $CeO_2/ZrO_2$ mixture. Under these conditions, the creation of reaction intermediates of the R—C-(adsorbed O) type, which is the first stage of the oxidation of the soot by $NO_2$, can be carried out in part without the involvement of $NO_2$, thus partially achieving freedom from the diffusional limitations of $NO_2$ at low temperature. An intermediate of the R—C(adsorbed O)-M type is then obtained, which intermediate subsequently reacts with $NO_2$ according to

R—C(adsorbed O)-M+$NO_2$→R—C($ONO_2$)+M

The carbo/nitric complexes obtained are then decomposed to CO, $CO_2$, carbon and NO, the metal oxide acting as catalyst making it possible to lower the temperature of this decomposition by 50° C.

In order to carry out this process, it has been supposed that the particle filter is impregnated with a compound having a formulation typical of a "$NO_x$ trap" (generally of the $BaCO_3$, $K_2CO_3$, and the like, type) also comprising a material with a high ability to release oxygen in a rich medium ("OSC compound"). Such a process is disclosed, for example, in the document EP-A-1 148 227.

In the "lean" operating phase of the engine (air/fuel ratio greater than the stoichiometric ratio), the accessible carbonaceous particles of the soot adsorb oxygen at their surface by the action of $NO_2$ (below 300° C.) and of oxygen (above 300° C.). Below 300° C., the $NO_x$ compounds emitted by the engine comprise a not insignificant fraction of $NO_2$. Furthermore, the presence of platinum in the $NO_x$ traps also makes it possible to convert NO to $NO_2$. The unused $NO_x$ compounds are trapped in the internal structure of the material for storage of $NO_x$ compounds in the form of nitrates, $Ba(NO_3)_2$, $KNO_3$, and the like.

In the "rich" operating phase of the engine (air/fuel ratio less than the stoichiometric ratio), the nitrates decompose to give rise to oxides or carbonates and to gaseous NO, which regenerates the $NO_x$ trap in a few seconds. On contact with platinum and/or with OSC materials (for example $CeZrO_x$) present in the $NO_x$ trap, the NO is partially converted to $NO_2$, the local release of which at the surface of the filter and close to the soot is favourable to increasing the kinetics of oxidation of the particles when the temperature is greater than 270–300° C.

Thus, in the processes which have just been described, the oxidation of the soot is carried out:
either by the oxygen resulting from the gas phase or from internal or external contact with a metal oxide: ceria, OSC material, residues from additives, and the like;
or by $NO_2$ in the gas phase.

The purpose of the invention is to provide another mode of action for the oxidation of the soot, which can substitute for or supplement the modes of action described above, for improving the effectiveness of the combustion of the soot during the regeneration of particle filters.

To this end, a subject-matter of the invention is a process for the decontamination of the emissions from an internal combustion engine, the exhaust line of which is equipped with a particle filter which is periodically regenerated by combustion of the soot particles which are deposited therein, characterized in that an additive of $NO_x$ trap type is added to the fuel feeding the said engine, so that the said additive is found trapped within the said soot, and in that, at the time of the regenerations of the particle filter, the engine is controlled with a richness balance according to at least one alternation of a lean-mixture phase and of a rich-mixture phase, so as to bring about the adsorption of the $NO_2$ from the exhaust gases by the said additive during the lean-mixture phase or phases and to bring about the oxidation of the soot particles by the adsorbed $NO_2$ during the rich-mixture phase or phases.

The said additive can comprise a material which is converted to nitrate during the lean-mixture phases.

The said material can be chosen from $K_2CO_3$, $BaCO_3$, materials which are transformed into $K_2CO_3$ or $BaCO_3$ during fuel combustion, and a mixture of these compounds.

The said additive can comprise a material with a high capability of releasing oxygen.

The said material with a high capability of releasing oxygen can be chosen from a mixture of ceria and of zirconia and platinum, or a mixture of these compounds.

The said additive can be a mixture of $K_2CO_3$, of ceria and of zirconia.

The concentration of additive of $NO_x$ trap type in the fuel is preferably less than 10 ppm by weight.

During the regenerations of the particle filter, the lean-mixture phases preferably last from 30 to 300 s and the rich-mixture phases preferably last from 3 to 30 s.

The said engine is preferably a diesel engine.

Another subject-matter of the invention is a device for the decontamination of exhaust gases resulting from an internal combustion engine fed with fuel from a tank, of the type comprising, on the exhaust line, a particle filter which collects the soot particles held by the said gases, characterized in that it comprises a tank including an additive of $NO_x$ trap type, means for adding the said additive to the fuel held in the tank and means for controlling the operation of the said engine according to an alternation of lean-mixture phases and rich-mixture phases during the stages of regeneration of the particle filter.

The said particle filter can comprise, at its outlet, a portion impregnated by a material of $NO_x$ trap type.

The exhaust line can comprise at least one reactor including an oxidation catalyst upstream of the particle filter.

The device preferably comprises means for regulating the means for addition of the additive to the fuel during the filling of the fuel tank, as a function of the amount of fuel added.

As will have been understood, the invention is based on the presence, in the fuel, of a further additive, the composition of which makes it possible to have available, in the very heart of the soot, small amounts of typical materials of $NO_x$ traps. Small amounts of $NO_2$ can thus be introduced into the very heart of the internal structure of the particles forming the soot aggregates, which will greatly facilitate the oxidation of the soot at low temperature. These compounds are typically alkali metal or alkaline earth metal compounds, in particular potassium or barium compounds, which are miscible in the fuel, for example potassium carbonate ($K_2CO_3$) or barium carbonate ($BaCO_3$). Instead of adding directly these carbonates to the fuel, it is possible to use as additives one or more compounds which, during fuel combustion, will be transformed into carbonates, for example potassium octoate or barium octoate.

As explained above, $NO_2$ is a superoxidant for soot owing to the fact that it is a promoter of the adsorption of oxygen on the accessible carbon particles of the soot from ambient temperature.

In the context of the application in the posttreatment of exhaust gases, it is the adsorbed liquids and their evaporation during the rises in temperature which limit the diffusion of the $NO_2$ to the surface of the soot in order to oxidize it.

By having available a material capable of producing $NO_2$ within the very internal structure of the soot, the diffusion barriers which limit its action at low temperature are thus found to be removed.

As also explained above, the materials of "$NO_x$ trap" type ($K_2CO_3$, $BaCO_3$, and the like) are converted to nitrates, which are stable in a lean medium. Experiments show that the nitrates do not introduce any advantage with regard to the catalysis of diesel soot at low temperature, in particular when the atmosphere of the diesel exhaust gases remains permanently lean.

In order for the additive to be active within the diesel soot, it is necessary for the atmosphere of the exhaust gases to be controlled in richness balance by the engine monitor, in order to allow, during the rich operating phases, decomposition of the nitrates present at the periphery and in the internal structure of the soot. The periodicity of the richness balances can be of the order of 60 s in lean operation and 6 s in rich operation, for example.

The decomposition of the nitrates resulting from the additive gives rise to the emission of NO, essentially, in the rich medium. To oxidize this NO and to convert it to $NO_2$ within the soot, it is preferable for the additive also to comprise a material of high oxygen storage capacity ("OSC"), such as ceria/zirconia ($CeZrO_x$), for example, or platinum.

The additive can also be composed solely of an organometallic phase capable of producing a fine dispersion of an oxide of ceria/zirconia type ($CeZrO_x$), the properties of which allow it to behave like an $NO_x$ trap material, with an additional advantage with respect to the combustion of the soot related to its lower rate of decomposition of the nitrates in a rich medium.

However, a mixed composition of $NO_x$ trap materials based on potassium ($K_2CO_3$) and on ceria/zirconia ($CeZrO_x$) is preferred on account of the known properties of potassium on the catalysis of hydrocarbons at low temperature, of use also in the drying of the diesel particles (the potassium helps in reducing the Soluble Organic Fraction to make possible better diffusion of the oxidizing gases into the bed of soot).

In order for all the soot to be found with an active additive within it, it is necessary for the additive to be present throughout the fuel. To this end, the additive is added to the fuel at each filling of the tank, so as to maintain a concentration of additive in the fuel which is always sufficient.

The invention will be better understood on reading the description which follows, given with reference to the single appended figure, which gives a diagrammatic representation of a diesel engine and its exhaust line, both equipped for the implementation of the process according to the invention.

Conventionally, the diesel engine 1 is fed with diesel oil by an injection system 2 which withdraws the diesel oil from a tank 3. The engine 1 also comprises, in the example represented, a turbo-compressor 4 driven by the exhaust gases which move in the exhaust line 5. The exhaust line 5 is equipped with a reactor 6 including an oxidation catalyst and with a catalyzed particle filter 7, for example of the honeycomb ceramic type, known per se. Optionally, an oxidation precatalyst 8 precedes the oxidation catalyst proper 6. The exhaust line is also equipped with temperature and pressure sensors which make it possible to control its operation. In particular, pressure sensors 9, 10 make it possible to measure the difference in pressure between the inlet of the oxidation catalyst 6 and the outlet of the particle filter 7. A relatively high difference in pressure is a sign that the particle filter 7 is fouled and that a regeneration operation has to be initiated. A temperature sensor 11 makes it possible to determine the temperature of the gases upstream of the particle filter 7.

According to the invention, the plant also comprises an additive tank 12 including an additive which can act as an $NO_x$ trap (or a compound which is transformed into such an additive during fuel combustion) and a pump 13 which makes it possible to add, to order, this additive to the diesel oil present in the tank 3, so that this additive is found incorporated within the soot particles emitted by the engine 1 and which are trapped inside the particle filter 7.

The functions of the various components can be summarized as follows;

The oxidation catalyst 6, active at low temperature (140/150° C.), has the role:
when the engine operates with a lean mixture:
  of converting the CO and hydrocarbon emissions of the engine to $CO_2$,
  of reducing as far as possible the Soluble Organic Fraction agglomerated with the particles (hydrocarbons, water, sulphates, and the like),
  of oxidizing the NO emissions to $NO_2$.
when the engine operates with a rich mixture, of reducing the content of oxygen in the exhaust gases by oxidizing the high emissions of hydrocarbons emitted by the engine.

The monolithic particle filter 7 positioned downstream of the oxidation catalyst 6 catches the soot particles emitted by the engine 1. The walls for exiting the exhaust gases are impregnated with a formulation which makes possible the reduction of the $NO_x$ compounds by the CO in a rich medium (type: Rh/alumina or $CeZrO_x$).

The system for supplying additive to the diesel oil 12, 13 makes it possible to introduce small amounts of liquid additive, "$NO_x$ trap", into the fuel tank 3. This additive is in a form which is miscible in the diesel oil.

The chemical composition of the additive is defined so as to bring about the presence or the formation, in the combustion chamber of the engine 1, of small amounts of a material capable of adsorbing the $NO_x$ compounds in the lean phase and of releasing them in the form of $NO_2$ in the internal structure of the soot particles or in the bed of soot formed on the porous walls of the particle filter 7.

During the operation of the engine with a lean mixture, the oxidation catalyst or catalysts 6, 8 placed upstream of the particle filter 7 convert the CO and the hydrocarbons to $CO_2$ and the $NO_x$ compounds to $NO_2$; it/they also contribute(s) to the reduction of the Soluble Organic Fraction of the particles.

The particles pick up $NO_x$ trap additive on their journey between the combustion chamber and the particle filter 7 in which they are retained. The $NO_2$ formed in the combustion chamber of the engine 1 or resulting from the conversion of the $NO_x$ compounds over the oxidation catalysts 6, 8 is adsorbed partially by the $NO_x$ trap additive present in the diesel soot and on the accessible carbon particles of the diesel soot.

The adsorption process takes place from ambient temperature in the diesel soot and above 180/200° C. within the $NO_x$ trap material, to form stable nitrates.

The $NO_x$ compounds not adsorbed by the additive present in the diesel soot are taken care of by the additive residue retained on the particle filter 7 and resulting from the combustion of the soot (as described below). After having been reduced or having been decomposed in the rich phase, the $NO_x$ trap additive residue has regained an oxide or carbonate form which can be reused in the lean phase to adsorb $NO_x$ compounds.

The additive residue, which interferes with other applications when it is used solely to oxidize the diesel soot, is then useful for the supplementary catalysis of the exhaust gases, in particular for the posttreatment of the $NO_x$ compounds.

The ability of the additive residue to store $NO_x$ compounds then becomes an increasing one as it accumulates in the particle filter 7. This is an advantage for the lasting maintenance of the potential for effectiveness in the posttreatment of $NO_x$ compounds of this type of catalyst, which is very sensitive to poisoning by sulphur and to high-temperature thermal runaways (700° C. and more).

The contributing of additive by the consumption of fuel makes it possible to continuously regenerate the catalysis function for the removal of the $NO_x$ compounds and to keep it effective throughout the duration of operation of the engine without a loss in performance.

During the operation of the engine with a rich mixture, the catalysts convert the high emissions of CO and of hydrocarbons resulting from the decomposition of the combustion process to bring about the operation of the engine 1 slightly below the air/fuel stoichiometric ratio.

The rich atmosphere conditions are then combined so that the nitrates formed within the diesel soot decompose and give rise to NO. The formulation of the additive then makes it possible to convert the NO formed to $NO_2$ within the soot because of the presence of an OSC function.

The passage as a rich mixture is conditioned at a minimum temperature level of 250° C. which is of use for the reaction of $NO_2$ with the carbonaceous part of the diesel soot, in order to remove the soot in the form of CO.

The overall chemical reaction of the oxidation of the diesel soot is as follows:

$$C(soot) + NO_2 \rightarrow CO + NO \qquad (1)$$

The engine monitor takes into account the temperature of the exhaust gases upstream of the particle filter 7, given by the sensor 11, and the level of accumulation of soot in the particle filter 7, given by the sensors 9 and 10, before initiating the passage as a rich mixture. If the temperature is below 250° C., the engine monitor carries out a postinjection of fuel to heat the exhaust gases up to this temperature.

The NO exiting from the diesel soot consumed according to the reaction (1) and the NO resulting from the decomposition of the nitrates formed within the additive residue are subsequently converted by the impregnation of the PF in the outlet channels. The NO is reduced by the CO resulting from the decomposition of the engine fuel and from the combustion of the soot according to (1). Active Rh/oxide sites can make possible this reduction from 200 to 250° C. according to the following reaction:

$$NO + CO \rightarrow N_2 + CO_2 \qquad (2)$$

The system makes possible the posttreatment of the four statutorily-controlled pollutants, CO, hydrocarbons, $NO_x$ compounds and particles, in an effective and lasting way because of its low sensitivity to poisoning by sulphur, the "$NO_x$ trap" function being continuously regenerated.

The system offers greater tolerance with regard to the use of sulphur-comprising diesel oil, even if a low sulphur content in the diesel oil remains necessary to obtain a lasting oxidation function in the oxidation catalysts 6, 8.

The fact of separating the functions of oxidation of the CO and the hydrocarbons from those of the posttreatment of the $NO_x$ compounds and of the particles makes it possible to retain the possibility of having available two supports in the particle filter 7, the first with a low thermal inertia, in order to be able to rapidly bring it up to temperature after cold start up, the second with a high thermal inertia favourable to the combustion of the diesel soot.

The catalysis of the particle filter 7 for the posttreatment of the $NO_x$ compounds in its outlet channels makes it possible to achieve freedom from the effects of fouling of the catalytic phase by the additive residues or the residues resulting from the combustion of the additives of the lubricating oil or of the diesel oil ($Ca(OH)_2$, $MgO/Mg(OH)_2$, phosphates, and the like).

The $NO_x$ trap offers better durability of the function of reduction of the $NO_x$ compounds owing to the fact that its formulation can be of the type developed in three-way catalysis for petrol engines, therefore thermally stable above 1000° C. Its positioning on the outlet channels of the particle filter 7 does not risk harming the maintenance of its durability, even during uncontrolled regenerations of the particle filter 7.

In order for the soot to be found with an effective concentration of $NO_x$ trap additive within it, it is necessary for this additive to be present in the fuel always at a sufficient concentration, of the order of 10 ppm by weight. However, this concentration must not be too high, in order not to bring about an excessive accumulation of residues in the particle filter 7, which would involve excessively frequent cleaning of the filter. To this end, it is advisable (as is already known for the addition of other additives to the fuel) to place the injection pump 13 under the control of a computer which regulates the addition of additive from the tank 12 at the time of each filling of the fuel tank 3. This addition of additive is adjusted according to the amount of fuel added, determined using a gauge, so as to maintain the desired concentration of additive in the fuel. The additive tank 12 is filled by the garage mechanic, for example during cleaning operations on the particle filter 7, which generally take place every 80 000 to 120 000 km.

In comparison with soot not comprising additive or comprising, as additive, simply cerium for lowering its combustion temperature, the invention makes it possible, on the one hand, to substantially lower the temperature at which the combustion of the soot can initiate (approximately 250° C.) and, on the other hand, to accelerate this combustion.

Thus, soot comprising a ceria/zirconia mixture and a material of $K_2CO_3$ or $BaCO_3$ type as additive incinerates at 300° C. under the conditions of the invention, that is to say with an engine operating with a richness balance, at a rate twice as fast as that of the combustion of soot comprising cerium as additive under lean conditions at 400° C. and eight times faster than that of the combustion of soot not comprising additive under lean conditions.

It should be understood that the impregnation of the outlet of the particle filter 7 by a formulation which makes possible the trapping of the $NO_x$ compounds is not obligatory. However, it is advisable in order to ensure that the standards with regard to the discharge of $NO_x$ compounds are observed. Likewise, the presence of the oxidation catalysts 6, 8 is not strictly necessary either, but only highly advisable, in order to reduce emissions of hydrocarbons and of CO and also, as has been seen, to form $NO_2$, which will contribute to the oxidation of the soot.

The invention has been described in the context of its application to the decontamination of the emissions from a diesel engine. However, it is applicable to the decontamination of the emissions from other types of internal combustion engines for which the problem might arise of the periodic removal of the soot accumulated in a particle filter.

The invention claimed is:

1. Process for the decontamination of the emissions from an internal combustion engine, the exhaust line of which is equipped with a particle filter which is periodically regenerated by combustion of the soot particles which are deposited therein, wherein an additive of $NO_x$ trap type is added to the fuel feeding said engine, so that said additive is found trapped within said soot, and, at the time of the regenerations of the particle filter, the engine is controlled with a richness balance according to at least one alternation of a lean-mixture phase and of a rich-mixture phase, so as to bring about the adsorption of the $NO_2$ from the exhaust gases by the said additive during the lean-mixture phase or phases and to bring about the oxidation of the soot particles by the adsorbed $NO_2$ during the rich-mixture phase or phases, wherein said additive comprises a mixture of $K_2CO_3$, ceria, and zirconia.

2. Process according to claim 1, wherein the concentration of additive of $NO_x$ trap type in the fuel is less than 10 ppm by weight.

3. Process according to claim 1, wherein, during the regenerations of the particle filter, the lean-mixture phases last from 30 s to 300 s and the rich-mixture phases last from 3 s to 30 s.

4. Process according to claim 1, wherein said engine is a diesel engine.

5. Device for the decontamination of exhaust gases resulting from an internal combustion engine fed with fuel from a tank, of the type comprising, on the exhaust line, a particle filter which collects the soot particles held by said gases, wherein said device comprises a tank including an additive of $NO_x$ trap type, means for adding said additive to the fuel held in the tank and means for controlling the operation of said engine according to an alternation of lean-mixture phases and rich-mixture phases during the stages of regeneration of the particle filter, wherein said additive comprises a mixture of $K_2CO_3$, ceria, and zirconia.

6. Device according to claim 5, wherein said particle filter comprises, at its outlet, a portion impregnated by a material of $NO_x$ trap type.

7. Device according to claim 6, wherein the exhaust line comprises at least one reactor including an oxidation catalyst upstream of the particle filter.

8. Device according to claim 6, wherein said device comprises means for regulating the means for addition of the additive to the fuel during the filling of the fuel tank, as a function of the amount of fuel added.

9. Device according to claim 5, wherein the exhaust line comprises at least one reactor including an oxidation catalyst upstream of the particle filter.

10. Device according to claim 9, wherein said device comprises means for regulating the means for addition of the additive to the fuel during the filling of the fuel tank, as a function of the amount of fuel added.

11. Device according to claim 5, wherein said device comprises means for regulating the means for addition of the additive to the fuel during the filling of the fuel tank, as a function of the amount of fuel added.

12. Device according to claim 5, wherein said additive comprises a material with a high capability of releasing oxygen.

13. Process according to claim 12, wherein said material with a high capability of releasing oxygen is chosen from a mixture of ceria and of zirconia and platinum, or a mixture of these compounds.

14. Process for the decontamination of the emissions from an internal combustion engine, the exhaust line of which is equipped with a particle filter which is periodically regenerated by combustion of the soot particles which are deposited therein, wherein an additive of $NO_x$ trap type is added to the fuel feeding said engine, so that said additive is found trapped within said soot, and, at the time of the regenerations of the particle filter, the engine is controlled with a richness balance according to at least one alternation of a lean-mixture phase and of a rich-mixture phase, so as to bring about the adsorption of the $NO_2$ from the exhaust gases by the said additive during the lean-mixture phase or phases and to bring about the oxidation of the soot particles by the adsorbed $NO_2$ during the rich-mixture phase or phases, wherein said additive comprises a material which is converted to nitrate during the lean-mixture phases, wherein said material is chosen from $K_2CO_3$, $BaCO_3$, materials which are transformed into $K_2CO_3$ or $BaCO_3$ during fuel combustion, and a mixture of these compounds, and wherein, during the regenerations of the particle filter, the lean-mixture phases last from 30 s to 300 s and the rich-mixture phases last from 3 s to 30 s.

15. Device for the decontamination of exhaust gases resulting from an internal combustion engine fed with fuel from a tank, of the type comprising, on the exhaust line, a particle filter which collects the soot particles held by said gases, wherein said device comprises a tank including an additive of $NO_x$ trap type, means for adding said additive to the fuel held in the tank and means for controlling the operation of said engine according to an alternation of lean-mixture phases and rich-mixture phases during the stages of regeneration of the particle filter, wherein said additive comprises a material which is converted to nitrate during the lean-mixture phases, wherein said material is chosen from $K_2CO_3$, $BaCO_3$, materials which are transformed into $K_2CO_3$ or $BaCO_3$ during fuel combustion, and a mixture of these compounds, and wherein, during the regenerations of the particle filter, the lean-mixture phases last from 30 s to 300 s and the rich-mixture phases last from 3 s to 30 s.

* * * * *